United States Patent
Goto et al.

(10) Patent No.: US 6,786,089 B2
(45) Date of Patent: Sep. 7, 2004

(54) AIRFLOW METER (75) Inventors: Koichi Goto, Kariya (JP); Yukihiro Takeuchi, Nishikamo-gun (JP); Takao Iwaki, Chiryu (JP); Yasushi Goka, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/253,502

(22) Filed: Sep. 25, 2002

(65) Prior Publication Data

US 2003/0182998 A1 Oct. 2, 2003

(30) Foreign Application Priority Data

Mar. 28, 2002 (JP) ........................................ 2002-092332

(51) Int. Cl.$^7$ ............................................. G01L 1/68
(52) U.S. Cl. .................................................. 73/204.21
(58) Field of Search ............................ 73/202.5, 118.2, 73/204.22, 204.26, 204.21

(56) References Cited

U.S. PATENT DOCUMENTS

| | | | |
|---|---|---|---|
| 5,942,683 A | * 8/1999 | Aoi et al. ................... | 73/202.5 |
| 5,948,975 A | * 9/1999 | Mueller et al. ............. | 73/118.2 |
| 6,131,453 A | * 10/2000 | Sultan et al. ............. | 73/204.26 |
| 6,148,663 A | 11/2000 | Stahl et al. | |
| 6,332,356 B1 | * 12/2001 | Hecht et al. ............... | 73/202.5 |
| 6,422,070 B2 | * 7/2002 | Reymann et al. .......... | 73/118.2 |
| 6,557,408 B1 | * 5/2003 | Mueller et al. ............ | 73/202.5 |
| 6,619,140 B2 | * 9/2003 | Kitahara et al. ......... | 73/861.52 |

* cited by examiner

Primary Examiner—Edward Lefkowitz
Assistant Examiner—Jewel V. Thompson
(74) Attorney, Agent, or Firm—Nixon & Vanderhye PC (57) ABSTRACT An airflow meter has a member that defines a bypass passage. The bypass passage has a sensing passage in which a sensor tip is disposed. The sensing passage is restricted in at least a lateral direction that is a direction perpendicular to both a longitudinal direction of the sensing passage and a perpendicular direction perpendicular to the surface of the sensor tip. This arrangement defines relatively wider distance in the perpendicular direction on the sensor tip.

20 Claims, 13 Drawing Sheets

AIRFLOW METER

CROSS REFERENCE TO RELATED APPLICATION

This application is based on Japanese Patent Applications No. 2001-93519 filed on Mar. 28, 2001 and No. 2002-92332 filed on Mar. 28, 2002 the contents of which are incorporated herein by reference.

BACKGROUND OF THE INVENTION

1. Field of the Invention:

The present invention relates to an airflow meter, specifically a bypass type airflow meter that has a bypass passage in which a part of air flowing through a main passage is introduced.

2. Description of Related Art:

JP-A-10-142020 (U.S. Pat. No. 5,948,975) and JP-A-11-511262 (U.S. Pat. No. 6,148,663) disclose airflow meters having bypass passages. The airflow meter disclosed in these documents has a partition member that separates the bypass passage, and a sensor element having a sensing plane. The sensor element is disposed on one surface of the partition member. The airflow meter further has a pair of tapered surfaces opposing the sensing plane of the sensor element. Therefore, the tapered surface faces the sensor element and defines a wall approaching the sensor element in a flow direction.

According to the arrangement described above, the tapered surface may direct dust and adhesive dust in the airflow toward the sensor element. The sensor element may be damaged by the dust or be polluted and covered by the adhesive dust. As a result, the sensor element may be deteriorated.

On the other hand, dust flowing in the main passage can easily reach to the sensor element, since the bypass passage in which the sensor element is disposed is parallel to the main passage and is directly opens toward upstream side of the main passage. In order to maintain a sensing function for a long period of time, it is important to protect the sensor element from dust in the airflow.

On the other hand, according to the arrangement described above, it is possible to reduce fluctuation and pulsation of airflow in a perpendicular direction of the sensing plane of the sensor element, since the tapered surface decreases a perpendicular distance between the sensor element and the tapered surface. However, airflow fluctuation in a parallel direction to the sensing plane of the sensor element still affects on the output of the sensor element.

SUMMARY OF THE INVENTION

It is an object of the present invention to provide an airflow meter which is capable of protecting the sensor element from foreign particles or dust in the airflow.

It is another object of the present invention to provide an airflow meter which is capable of reducing an influence of fluctuation of airflow.

According to a first aspect of the present invention, a sensing passage restricts a cross-sectional area of a bypass passage along a longitudinal direction of the bypass passage at least before a sensor element. The sensing passage is restricted in at least width in a lateral direction with respect to the sensor element. It is possible to define a restrictor in the bypass passage. Such a restrictor can be obtained by restricting the width in the lateral direction. Therefore, it is possible to reduce fluctuation and pulsation in the lateral direction. On the other hand, the arrangement enables relatively wider perpendicular width of the sensing passage on the sensor element. Therefore it is possible to protect the sensor element from damage caused by foreign particles or dust.

In addition, the sensing passage may be restricted in both width in the lateral direction and width in a perpendicular direction perpendicular to the sensor element. This arrangement is also effective to reduce fluctuation and pulsation.

In addition, the sensing passage may be defined as follows, $1.0 \leq L1/H$, $1.0 \leq L2/H$, and $2.5 \leq W/H \leq 20.0$, wherein H is a maximum height of the surface, L1 is a length in the longitudinal direction between a beginning point of restriction and the maximum height, L2 is a length in the longitudinal direction between the maximum height and an ending point of restriction, and W is a width of the bypass passage. This arrangement is capable of providing an appropriate sensing characteristic, and protecting the sensor element from damage caused by foreign particle or dust.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
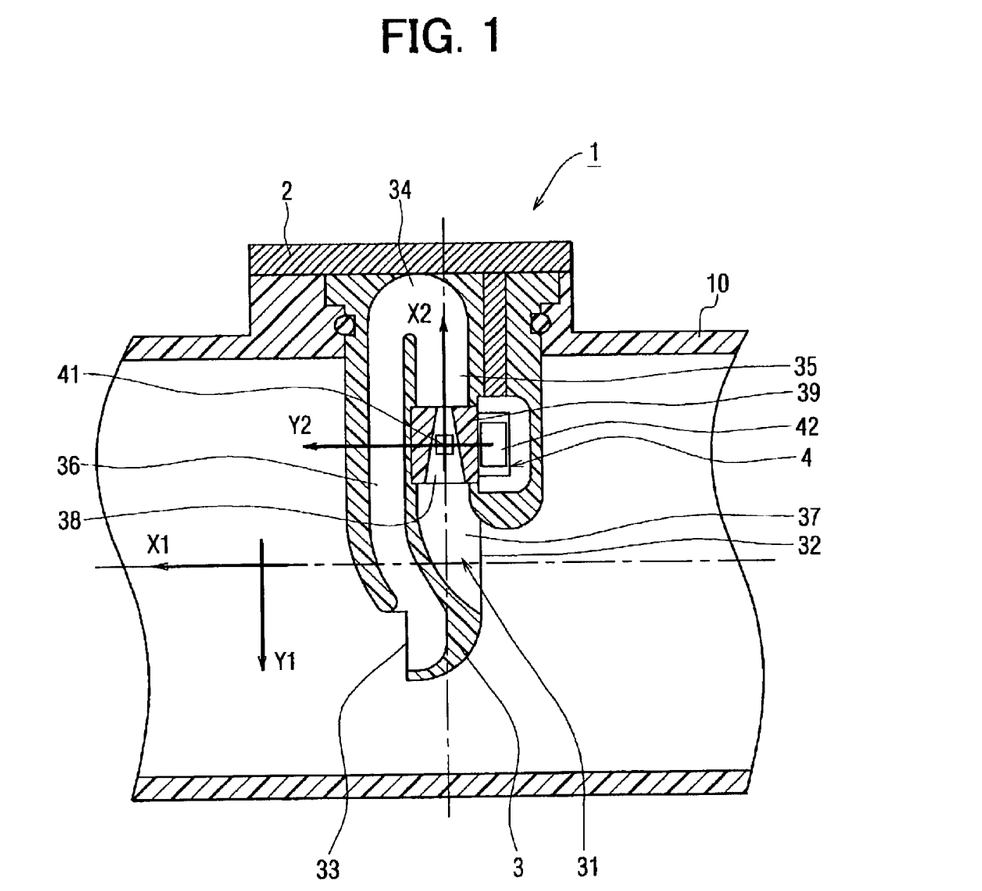
FIG. 1 is a longitudinal cross-sectional view of an airflow meter according to a first embodiment of the present invention.

Referring to FIG. 1, an airflow meter 1 is disposed on an intake pipe 10 of an engine for a vehicle. The airflow meter 1 detects an amount of airflow aspirated by the engine, and outputs a signal indicative of the detected amount of airflow. The intake pipe 10 defines a main passage in which a main airflow flows in a longitudinal direction X1 as shown in FIG. 1. Although the intake pipe 10 is illustrated horizontally, the intake pipe 10 may be disposed vertically on the vehicle.

The intake pipe 10 has a through hole and a mounting base on the wall thereof. The airflow meter 1 is inserted and mounted on the intake pipe 10. The airflow meter 1 is arranged as a plug-in type. The airflow meter 1 has a base portion 2, a bypass defining portion 3 and an electric sensing portion 4. The base portion is attached on the mounting base formed on the intake pipe 10, and supports the bypass defining portion 3 and the electric sensing portion 4. The bypass defining portion 3 is formed in a generally columnar shape that projects into the intake pipe 10. An O-ring is disposed between the bypass defining portion 3 and the intake pipe 10. The electric sensing portion 4 is mounted on the bypass defining portion 3 and has an electrical connector on the base portion 2.

The bypass defining member 3 has a first columnar portion and a second columnar portion located upstream side of the first columnar portion. The first columnar portion defines a bypass passage 31 therein. The second columnar portion supports the electric sensing portion 4 therein. The bypass passage 31 is formed in a generally U-shape or Ω(Omega)-shape, and has an inlet 32 and an outlet 33. The bypass passage 31 generally extends perpendicular to the longitudinal direction X1 of the intake pipe 10.

The inlet 32 is located on the center of the intake pipe 10, and opens toward an upstream side of the intake pipe 10. The inlet 32 directly receives airflow in the longitudinal direction X1 in the intake pipe 10. The inlet 32 has the largest cross-sectional area in the bypass passage 31. The bypass passage 31 has a U-turn portion 34 formed on the midway thereof. The bypass passage 31 has an upstream side straight portion 35 between the inlet 31 and the U-turn portion 34. The bypass passage 31 further has a downstream side portion 36 between the U-turn portion 34 and the outlet 33. The downstream side portion 36 is curved in a S-shape at a downstream thereof so as to shift the outlet 33 slightly in an upstream of the intake pipe 10. The outlet 33 is located slightly downstream of the inlet 32 in the intake pipe 10. The outlet 33 generally opens toward downstream of the intake pipe 10.

The bypass passage 31 has an inlet bend 37 between the inlet 32 and the upstream side straight portion 34. The inlet bend 37 is defined with smooth curved surfaces and defines 90 degrees bend. The bypass passage 31 has a sensing passage 38 in the upstream side straight portion 35. The inlet bend 37 and a member that defines the inlet bend 37 make it difficult to reach to the sensing passage 38 directly from the inlet 32.

The sensing passage 38 is defined by a member 39. The member 39 is integrally assembled with the electric sensing portion 4. The electric sensing portion 4 has a sensor tip 41 disposed in the sensing passage 38. The sensor tip 41 is a sensor element in this embodiment. The sensor tip 41 is formed in a plate shape. The sensor tip 41 has a surface exposed to the sensing passage 38. The exposed surface is plane. The sensor tip 41 is provided as a heat type airflow meter that has at least one of heater element and at least one of sensor element. In this embodiment, the heater element and the sensor element are formed on the plane surface of the sensor tip 41. The sensor tip 41 is a unidirectional sensor that detects an amount of airflow flowing from the inlet 32 to the outlet 33 in the longitudinal direction X2. The electric sensing portion 4 has a sensor circuit 42 that drives the sensor tip 41 to generate the signal indicative of the amount of the airflow.

The sensing passage 38, specifically, the sensor tip 41 disposed within the sensor passage 38 is not exposed directly to the upstream side of the intake pipe 10. In this embodiment, the bypass passage member 3 conceals the sensor tip 41 so that the sensor tip 41 is not visible from the inlet 32 along the longitudinal axis X1. Therefore, the sensor tip 41 is protected from a foreign particle or dust. If the foreign particle or dust enters into the bypass passage 31, the inlet bend 37 reduces the speed of the foreign particle or dust before they reach to the sensor tip 41. Therefore, it is possible to reduce damage of the sensor tip 41.

In FIG. 1, an axis X1 indicates the longitudinal direction of the intake pipe 10. An axis Y1 indicates an inserting direction of the airflow meter 1 and an extending direction of the bypass passage 31. An axis Z1 perpendicular to the axes X1 and Y1 is not illustrated. An axis X2 is defined in parallel to the sensor tip 41 and parallel to a longitudinal direction of the sensing passage 38. The axis X2 is parallel to a flow direction in the sensing passage 38. The axis X2 is also parallel to the extending direction of the bypass passage 31. An axis Y2 is defined in parallel to the sensor tip 41 and perpendicular to the axis X2. The axis Y2 indicates a lateral direction of the sensing passage 38. Although, an axis Z2 is not illustrated in FIG. 1, the axis Z2 indicates a perpendicular direction to the sensor tip 41. The axes X2, Y2, and Z2 are illustrated in the following figures too.

Referring to FIGS. 2 to 6, the member 39 is explained in detail. The member 39 has an outside member 3A and a partition member 3B. The outside member 3A is formed like a rectangular duct that has a slit in which the partition member 3B is received. The outside of the outside member 3A is a square pole. The outside member 3A has wedge shape walls. Each wall becomes thicker in the longitudinal direction X2. The inside of the outside member 3A has four inclined surfaces 3C, 3D, 3E, and 3F for defining a flow restrictor. Therefore, cross-sectional area of the sensing passage 38 is gradually decreased from an inlet of the sensing passage 38 in a flow direction. The member 39 provides abrupt expansion of cross-sectional area at an outlet of the sensing passage 38. The member 39 has a profile for decreasing airflow in a reverse direction of the longitudinal direction X2. The wedge shape walls of the outside member 3A are effective to prevent reverse flow from entering into the sensing passage 38.

The partition member 3B is disposed in the center of the sensing passage 38 to separate the sensing passage 38 into two independent passages. The partition member 3B supports the sensor tip 41 on one surface thereof. The partition member 3B also supports the sensor circuit 42 on the end thereof. The partition member 3B is disposed in parallel to the longitudinal direction X1 of the intake pipe 10. Therefore, the foreign particle and dust entering into the bypass passage may not directly hit on the sensor tip 41.

A pair of surfaces 3C and 3D is arranged in a tapered manner so that a lateral width of the sensing passage 38 along the axis Y2 is gradually decreased from the inlet to the outlet of the sensing passage 38. Therefore, an airflow flowing on the surface of the sensor tip 41 is shrunken in the lateral direction Y2 of the sensor tip 41.

A pair of surfaces 3E and 3F is arranged in a tapered manner so that a perpendicular width of the sensing passage 38 along the axis Z2 is gradually decreased from the inlet to the outlet of the sensing passage 38. Specifically, the surface 3F opposite to the sensor tip 41 gradually approaches to the sensor tip 41 and the partition member 3B. Therefore, the airflow flowing on the surface of the sensor tip 41 is shrunken in the perpendicular direction Z2 of the sensor tip 41.

Further, it is possible to reduce or minimize a restriction in the perpendicular direction Z2, because the sensing passage 38 is also restricted in the lateral direction Y2 in order to obtain a sufficient restriction. For example, it is possible to widen the perpendicular distance between the sensor tip 41 and the surface 3F. As a result, it is possible to reduce the damage of the sensor tip 41 caused by a foreign particle and dust directed to the sensor tip 41 by the inclined surface 3F.

Figure 2:
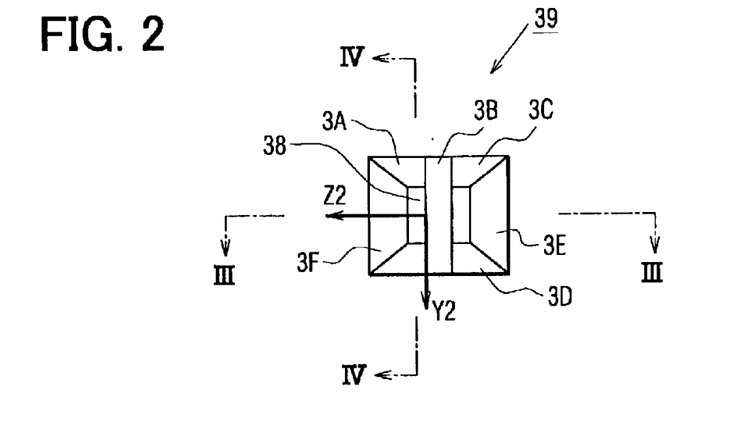
FIG. 2 is a plan view of an inlet of a sensing passage according to the first embodiment of the present invention.
Figure 3:
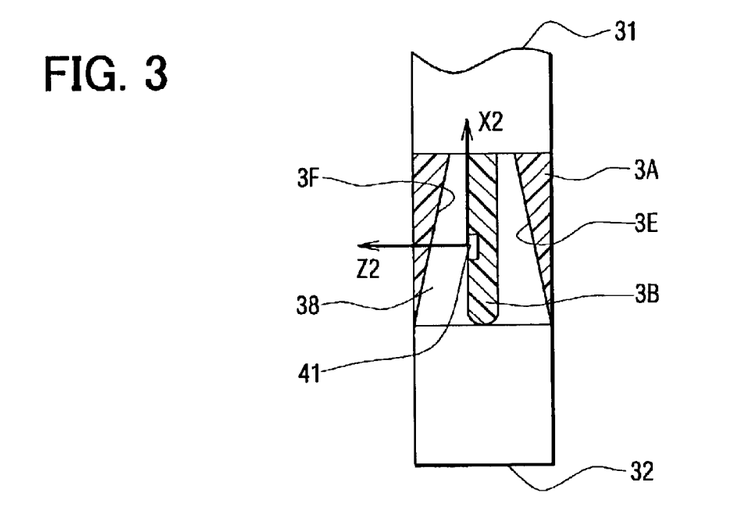
FIG. 3 is a cross-sectional view of the sensing passage taken along III—III line in FIG. 2 according to the first embodiment of the present invention.
Figure 4:
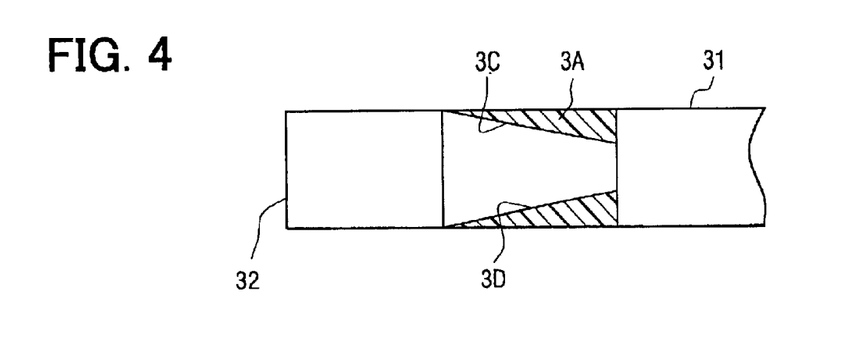
FIG. 4 is a cross-sectional view of the sensing passage taken along IV—IV line in FIG. 2 according to the first embodiment of the present invention.
Figure 5:
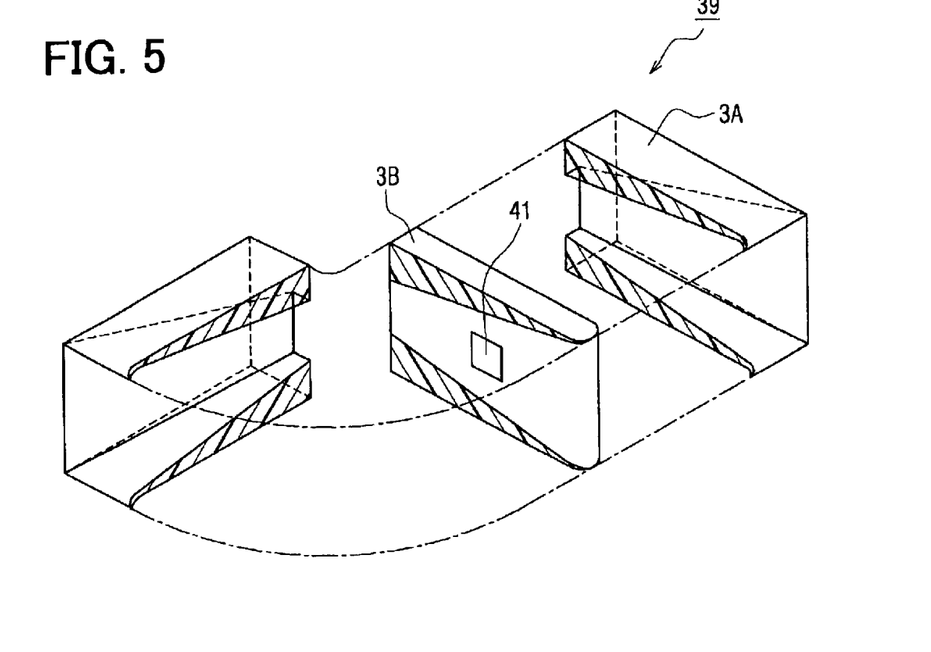
FIG. 5 is an exploded diagram of the sensing passage according to the first embodiment of the present invention.
Figure 6:
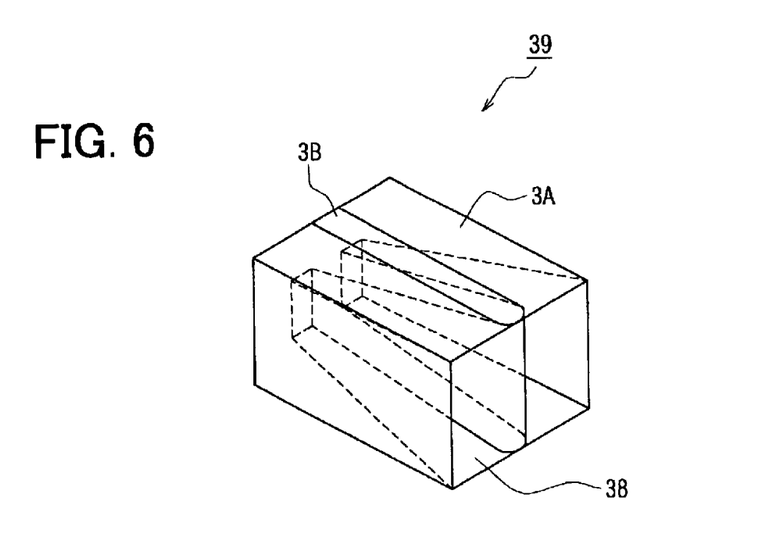
FIG. 6 is a perspective view of the sensing passage according to the first embodiment of the present invention.

In an operation, when main airflow flows in the intake pipe 10, a predetermined ratio of the main airflow is introduced into the bypass passage 31 as bypass airflow. The bypass airflow bends 90 degrees at the inlet bend 37. The inlet bend 37 reduces kinetic energy of a foreign particle and dust entering into the inlet 32. The bypass airflow is shrunken and regulated into a uniform flow by the shrinking sensing passage 38. The sensing passage 38 is restricted in not only the perpendicular direction Z2 but also the lateral direction Y2. As a result, the sensing passage 38 has a relatively wider width in the perpendicular direction Z2 due to the restriction in the lateral direction Y2 provided by the surfaces 3C and 3D. The sensing circuit 42 activates the sensor tip 41 and detects an amount of the bypass airflow. Since the ratio of the main airflow and the bypass airflow is defined by a configuration of the airflow meter 1, the detected amount of the bypass airflow proportionally indicates the amount of the main airflow.

As described above, the sensor tip 41 is protected from the foreign particle and dust. On the other hand, it is possible to reduce fluctuation of airflow flowing on the sensor tip 41.

The shape of the walls of the outside member 3A may be changed in accordance with a requirement. For example, in case of using bi-directional sensor in the sensor tip 41, the outside member 3A may have walls symmetrical in the longitudinal direction X2.

Hereinafter, the other embodiments of the present invention are explained with reference to the drawings. In the following description, the same reference numbers are used to indicate the same element as the first embodiment in order to avoid redundant description.

Figure 7:
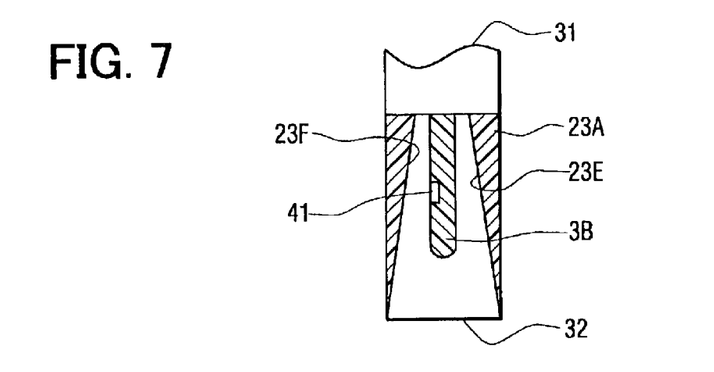
FIG. 7 is a cross-sectional view of a sensing passage according to a second embodiment of the present invention.
Figure 8:
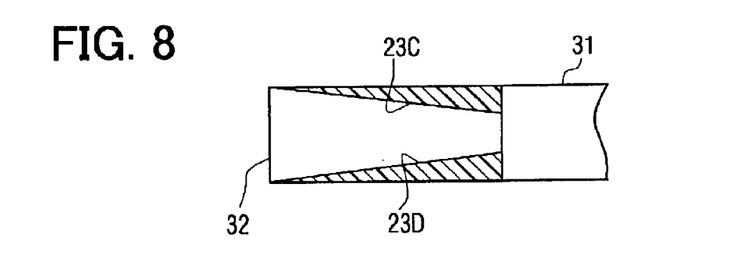
FIG. 8 is a cross-sectional view of a sensing passage according to the second embodiment of the present invention.

FIGS. 7 and 8 illustrate a second embodiment of the present invention. FIG. 7 shows a view corresponding to FIG. 3. FIG. 8 shows a view corresponding to FIG. 4. An outside member 23A defines inclined surfaces 23C, 23D, 23E and 23F which are longer than the partition member 3B and are started from the inlet 32. The inlet bend 37 is formed within the outside member 23A. The outside member 23A defines a longer restrictor than the first embodiment. According to the second embodiment, it is possible to improve the accuracy of the detection in a certain application.

Figure 9:
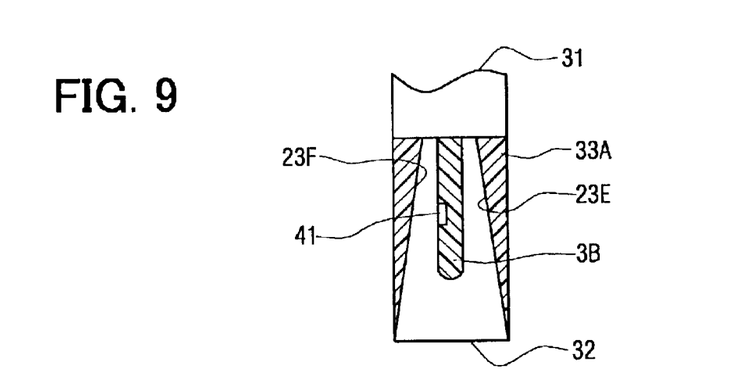
FIG. 9 is a cross-sectional view of a sensing passage according to a third embodiment of the present invention.
Figure 10:
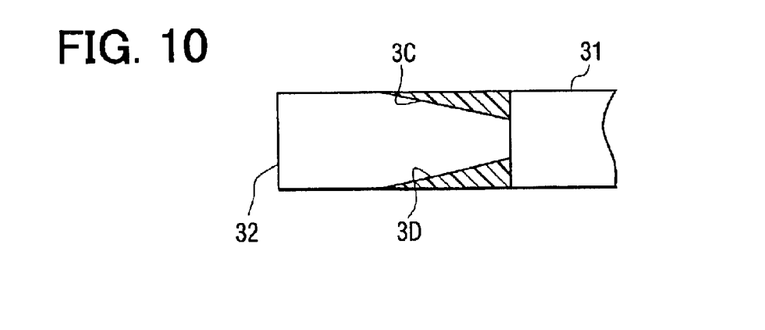
FIG. 10 is a cross-sectional view of a sensing passage according to the third embodiment of the present invention.

FIGS. 9 and 10 illustrate a third embodiment of the present invention. FIG. 9 shows a view corresponding to FIG. 3. FIG. 10 shows a view corresponding to FIG. 4. An outside member 33A has the inclined surfaces 3C and 3D that are the same as the first embodiment. The outside member 33B has the inclined surfaces 23E and 23F that are the same as the second embodiment. The sensing passage is gradually restricted in width in the perpendicular direction Z2 before the sensing passage is gradually restricted in both directions Y2 and Z2. This arrangement may provide similar advantages to the first and second embodiments.

Figure 11:
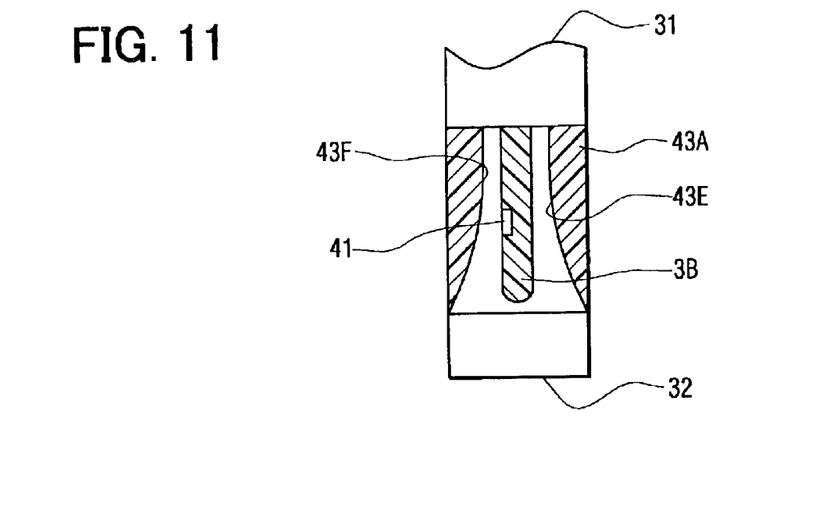
FIG. 11 is a cross-sectional view of a sensing passage according to a fourth embodiment of the present invention.
Figure 12:
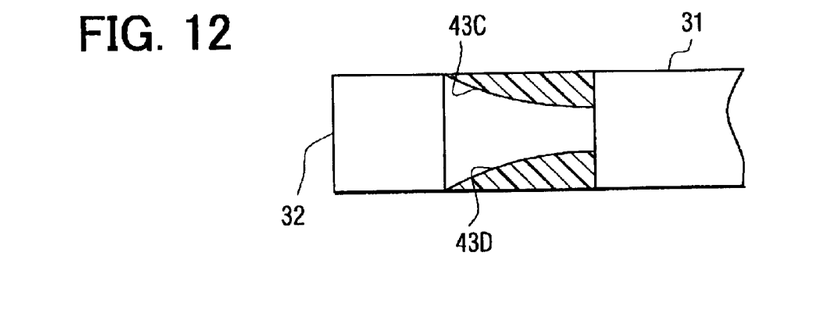
FIG. 12 is a cross-sectional view of a sensing passage according to the fourth embodiment of the present invention.

FIGS. 11 and 12 illustrate a fourth embodiment of the present invention. FIG. 11 shows a view corresponding to FIG. 3. FIG. 12 shows a view corresponding to FIG. 4. An outside member 43A defines inclined surfaces 43C, 43D, 43E and 43F that have curved profiles respectively. This arrangement may provide similar advantages to the above-mentioned embodiments.

Figure 13:
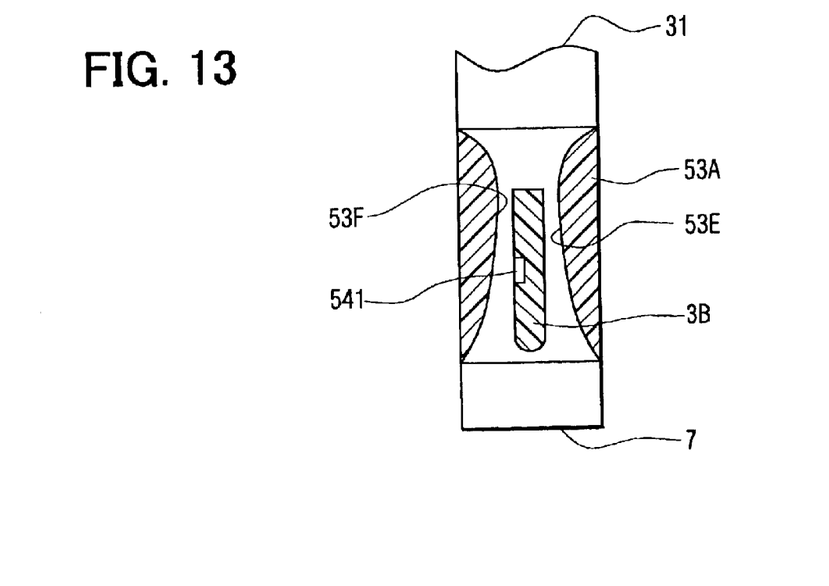
FIG. 13 is a cross-sectional view of a sensing passage according to a fifth embodiment of the present invention.

FIG. 13 illustrates a fifth embodiment of the present invention. FIG. 13 shows a view corresponding to FIG. 3. An outside member 53A defines inclined surfaces 53E and 53F. The surfaces 53E and 53F are defined by curved profiles. The surfaces 53E and 53F has inclinations in both longitudinal ends thereof. The surfaces 53E and 53F have relatively sharp inclination on the downstream side thereof. In this embodiment, a bi-directional type sensor tip 541 is mounted on the partition member 3B. The outside member 53A also defines surfaces disposed on the lateral direction of the sensor tip 541. These surfaces have the same profiles as the surfaces 53E and 53F. The profile of the sensing passage is capable of regulating airflow in both of a forward direction and a reverse direction of the longitudinal direction X2. According to the fifth embodiment, it is possible to detect the reverse flow in addition to the advantages in the above-mentioned embodiments.

Figure 14:
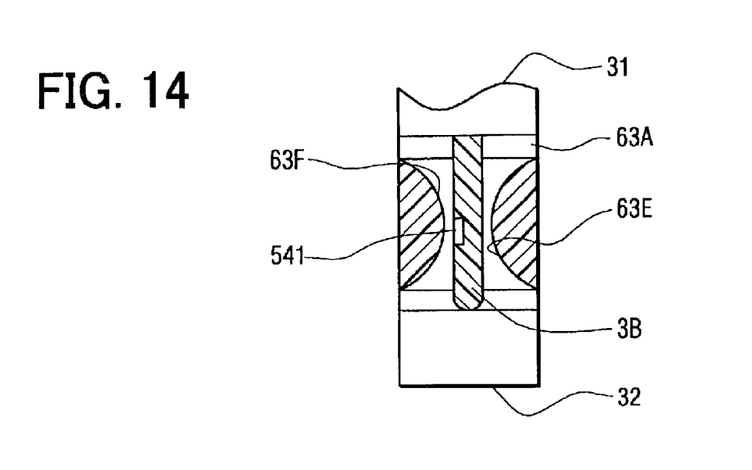
FIG. 14 is a cross-sectional view of a sensing passage according to a sixth embodiment of the present invention.

FIG. 14 illustrates a sixth embodiment of the present invention. FIG. 14 shows a view corresponding to FIG. 3. An outside member 63A defines inclined surfaces 63E and 63F. The inclined surfaces 63E and 63F are defined by substantially cylindrical surfaces. The inclined surface 63F provides a most restricted portion above the sensor tip 541. The surfaces 63E and 63F are symmetrical in the longitudinal direction of the sensing passage 38. The length of the inclined surfaces 63E and 63F is shorter than the length of the partition member 3B. The outside member 63A defines surfaces on the lateral direction, which are the same profile as the surfaces 63E and 63F on the perpendicular direction. The surfaces 63E and 63F obtains relatively abrupt decrease of cross-sectional area of the bypass passage 31 at a point just before the sensor tip 541. The profile of the sensing passage obtains a restricting rate that is abruptly changed at the point close to the sensor tip. Such an abrupt decrease of cross-sectional area of the bypass passage 31 reduces the fluctuation and pulsation of airflow effectively. According to the fifth embodiment, it is possible to achieve the same advantages in the above-mentioned embodiments.

Figure 15:
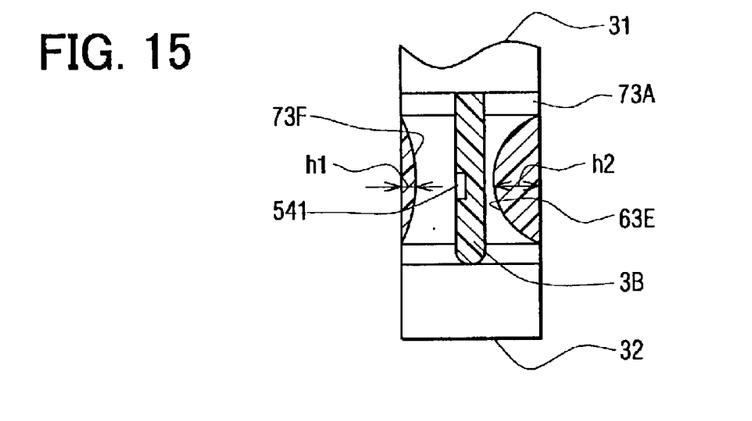
FIG. 15 is a cross-sectional view of a sensing passage according to a seventh embodiment of the present invention.

FIG. 15 illustrates a seventh embodiment of the present invention. FIG. 15 shows a view corresponding to FIG. 3. An outside member 73A defines inclined surfaces 63E and 73F. The outside member 73A defines surfaces on the lateral direction, which are the same profile as the surface 63E. The height h1 defined by the surface 73F is smaller than the height h2 defined by the surface 63E. The heights h1 and h2 are determined to tune an output characteristic of the sensor tip 541. For example, the heights h1 and h2 are differentiated in order to reduce an influence of fluctuation and pulsation.

Figure 16:
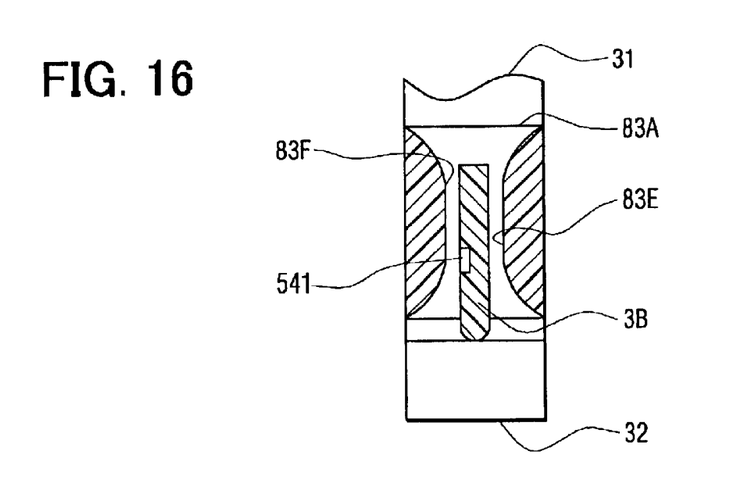
FIG. 16 is a cross-sectional view of a sensing passage according to an eighth embodiment of the present invention.
Figure 17:
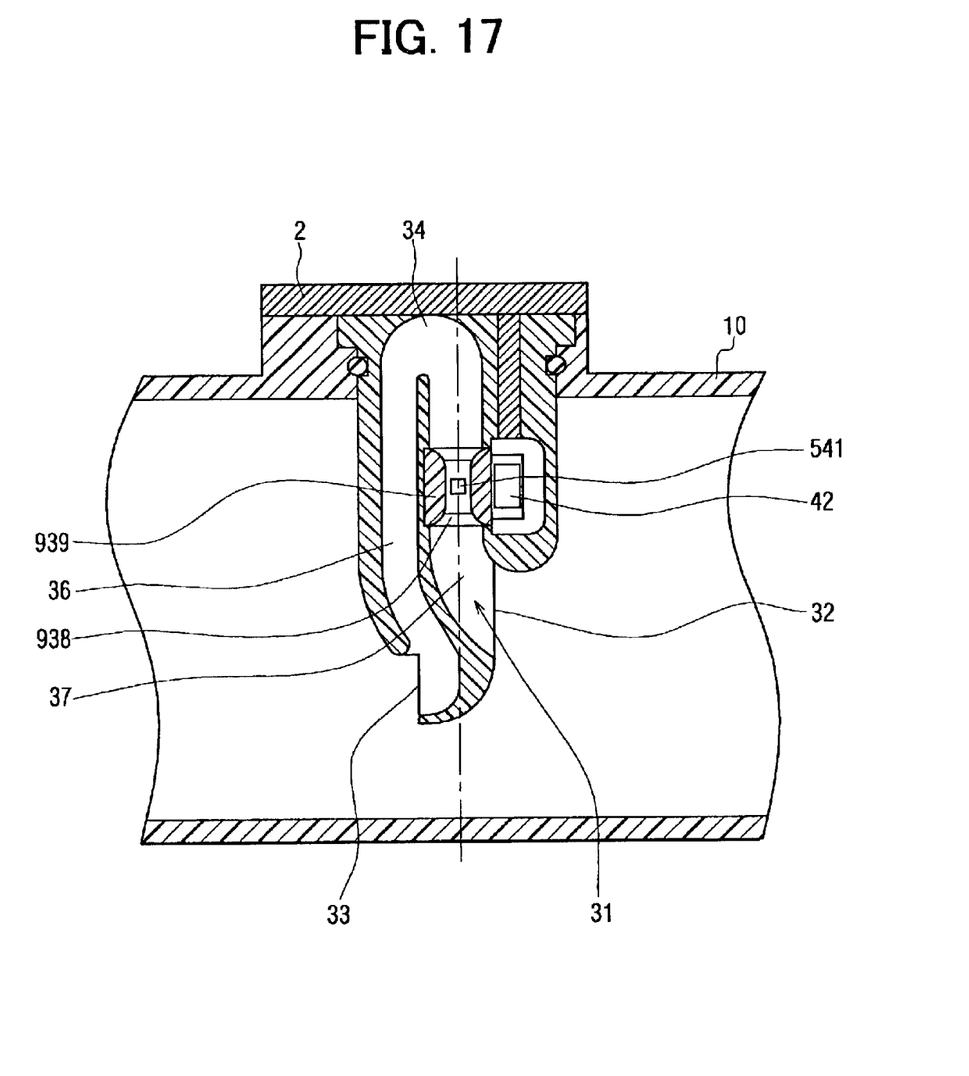
FIG. 17 is a longitudinal cross-sectional view of an airflow meter according to a ninth embodiment of the present invention.
Figure 18:
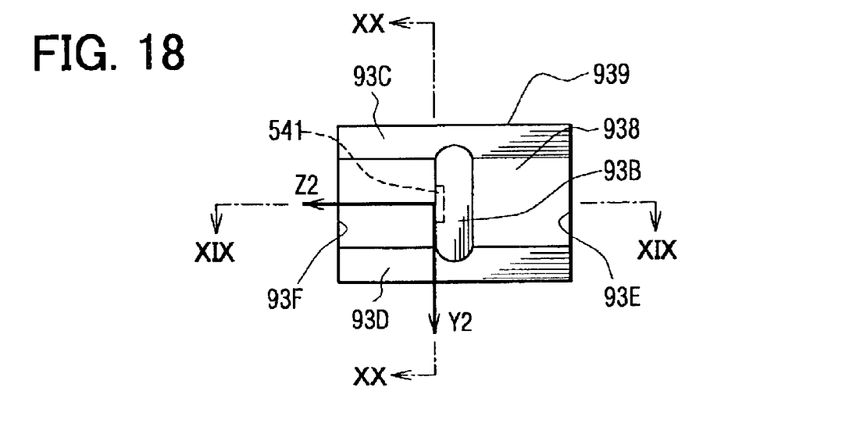
FIG. 18 is a plan view of an inlet of a sensing passage according to the ninth embodiment of the present invention.
Figure 19:
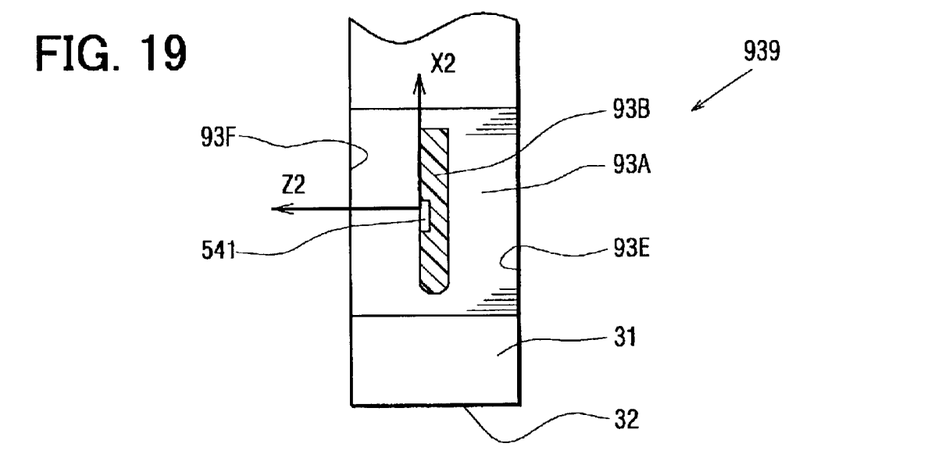
FIG. 19 is a cross-sectional view of the sensing passage taken along XIX—XIX line in FIG. 18 according to the ninth embodiment of the present invention.

FIG. 16 illustrates an eighth embodiment of the present invention. FIG. 16 shows a view corresponding to FIG. 3. An outside member 83A defines surfaces 83E and 83F. The outside member 83A defines the same profiles as the surfaces 83E and 83F on the lateral direction. Each of the surfaces 83E and 83F has a curved leading edge on an upstream side thereof, a curved trailing edge on a downstream side thereof, and a top plane between them. The top plane of the surface 83F faces the sensor tip 541 and is parallel to the sensor tip 541. The leading edge of the surfaces 83E and 83F are located on a downstream of a leading edge of the partition member 3B. The trailing edge of the surfaces 83E and 83F are also located downstream of a trailing edge of the partition member 3B. According to the eighth embodiment, it is possible to use the sensor tip 541 that has quick response in addition to the advantages of the above-mentioned embodiments.

Figure 20:
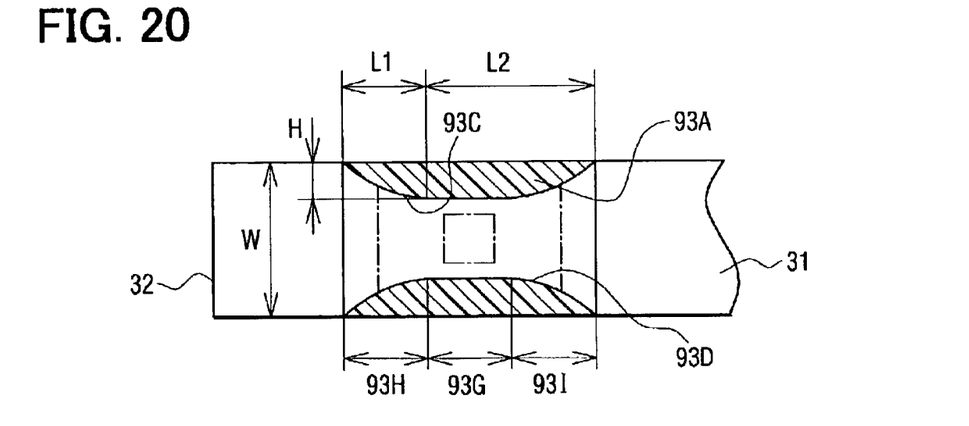
FIG. 20 is a cross-sectional view of the sensing passage taken along XX—XX line in FIG. 18 according to the ninth embodiment of the present invention.

FIGS. 17 to 20 illustrate a ninth embodiment of the present invention. FIGS. 17 to 20 are views corresponding to FIGS. 1 to 4 respectively. In FIG. 20, projected images of the sensor tip 541 and the partition member 93B are illustrated in order to show relative length of restrictor protrusions. A member 939 defines a sensing passage 938. The member 939 has an outside member 93A and a partition member 93B. The outside member 93A provides surfaces 93C, 93D, 93E and 93F for defining the sensing passage 938. The surfaces 93E and 93F are flat surfaces and are flash to the inner surface of the bypass passage 31. In the ninth embodiment, the perpendicular width in the perpendicular direction Z2 of the sensing passage 938 is narrowed by the partition member 93B only. The perpendicular width defined between the surface 93F and the partition member 93B is constant along almost all of a longitudinal length of the partition member 93B except for a leading and trailing edges thereof.

The surfaces 93C and 93D protrudes inwardly. The surfaces 93C and 93D restricts the sensing passage 938. The lateral width in the lateral direction Y2 of the sensing passage 938 is gradually decreased from an inlet of the sensing passage 938, and then, is gradually increased to an outlet of the sensing passage 938. Each of the surfaces 93C and 93D is formed in a symmetrical shape in the longitudinal direction X2.

According to the ninth embodiment, it is possible to form the perpendicular width between the surface 93F and the sensor tip 541 as wide as possible. The partition member 93B is only a member that restricts the perpendicular total width of the sensing passage 938. The perpendicular total width of the sensing passage 938 is a sum of a width between the surface 93E and the partition member 93B and a width between the surface 93F and the partition member 93B. However, both of the surfaces 93C and 93D projected inwardly restrict the lateral width of the sensing passage 938.

The bypass airflow is more restricted in the lateral direction Y2 than in the perpendicular direction Z2, and the surface 93F does not direct a foreign particle or dust toward the sensor tip 541. As a result, it is possible to reduce a damage of the sensor tip 541 caused by a foreign particle or dust. Further, the perpendicular total width of the sensing passage 938 is wider than the lateral width of the sensing passage 938. This arrangement is also effective in reducing damage of the sensor tip 541. Still further, the perpendicular width between the sensor tip 541 and the surface 93F is maintained wider than the lateral width of the sensing passage 938. This arrangement is also effective in reducing damage of the sensor tip 541. In the embodiments, the partition member 93B deflects a foreign particle or dust from the sensor tip 541.

Each of the surfaces 93C and 93D has a top plane 93G, a leading curved edge 93H and a trailing curved edge 93I. The leading curved edge 93H gradually restrict the sensing passage 938, and reaches a height H at a boundary to the top plane 93G. The top plane 93G begins at a point upstream to the sensor tip 541 and ends at a point downstream to the sensor tip 541. A leading portion of the member 939 including the leading curved edge 93H has a length L1 in the longitudinal direction X2. The length L1 is defined as a length between a leading edge of the member 939 and a point in which the surfaces 93C and 93D reaches to the height H. A trailing portion of the member 939 including the top plane 93G and the trailing curved edge 93I has a length L2 in the longitudinal direction X2. The bypass passage 31 has a width W in the lateral direction Y2.

Figure 21:
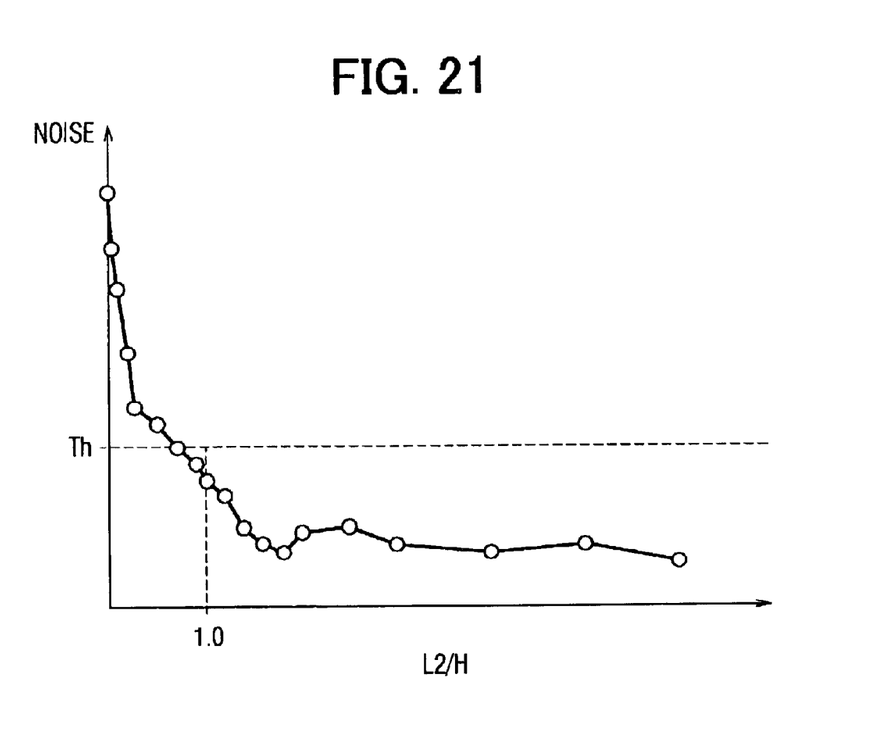
FIG. 21 is a graph showing noise level in an output signal of the airflow meter versus L2/H according to the ninth embodiment of the present invention.

FIG. 21 shows a preferred value of the length L2 and height H regarding a noise level in an output signal of the airflow meter. The noise level is maintained at relatively low level when a ratio L2/H is greater than 1.0. The noise level is abruptly increased when the ratio L2/H is smaller than 1.0. Therefore, it is preferable that the ratio L2/H is greater than substantially 1.0 ($1.0 \leq L2/H$). Usually, a permissible noise level Th is required in accordance with a specific application. Therefore, the ratio L2/H should be set so that the noise level is kept below the permissible noise level Th. Although the ninth embodiment illustrates an asymmetric arrangement of the length L1 and length L2, a symmetric arrangement in which the length L1 is equal to the length L2 is also applicable. In the case of the symmetric arrangement, the ratio L1/H is set greater than 1.0 ($1.0 \leq L1/H$).

Figure 22:
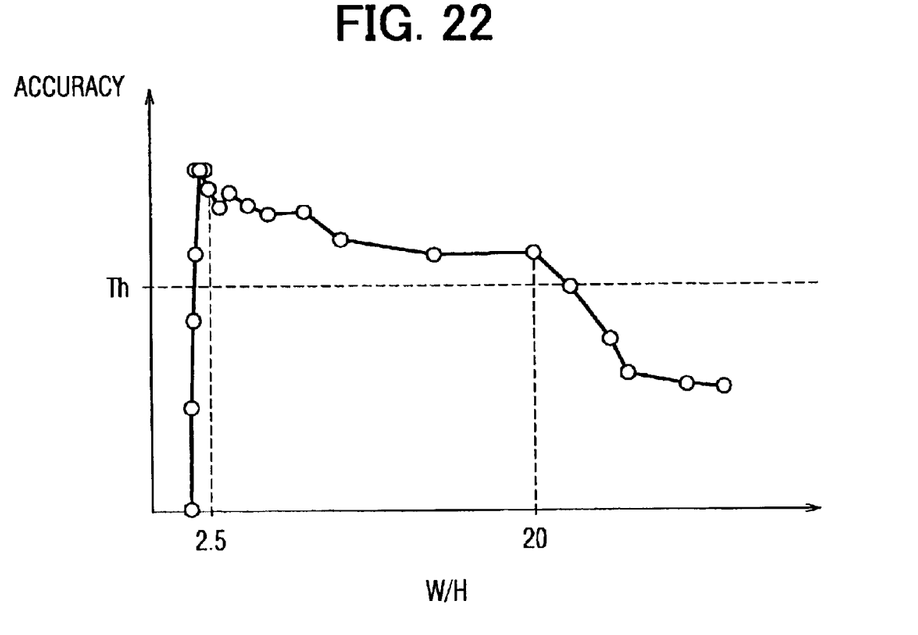
FIG. 22 is a graph showing detecting accuracy of the airflow meter versus W/H according to the ninth embodiment of the present invention.

FIG. 22 shows a preferred value of the width W and the height H. The vertical axis indicates a detecting accuracy of the airflow meter. The detecting accuracy is defined by an actual amount of the airflow to be measured and a measured amount of the airflow measured by the airflow meter. The detecting accuracy is maintained in high level when a ratio W/H is in a range between substantially 2.5 and substantially 20.0. The detecting accuracy is abruptly decreased when the ratio W/H is smaller than 2.5 and grater than 20.0. Therefore, it is preferable that the ratio W/H is in a range between 2.5 and 20.0 (2.5≦W/H≦20.0). A permissible detecting accuracy Th is usually set in accordance with a certain application. Therefore, the values of the width W and the height H should be set so that the detecting accuracy is kept higher than the permissible detecting accuracy Th.

The sensing passage of the ninth embodiment is defined to satisfy the following conditions, 1.0≦L1/H, 1.0≦L2/H, and 2.5≦W/H≦20.0, wherein H is a maximum height of the surface, L1 is a length in the longitudinal direction X2 between a beginning point of restriction and the maximum height, L2 is a length in the longitudinal direction X2 between the maximum height and an ending point of restriction, and W is a width of the bypass passage.

Figure 23:
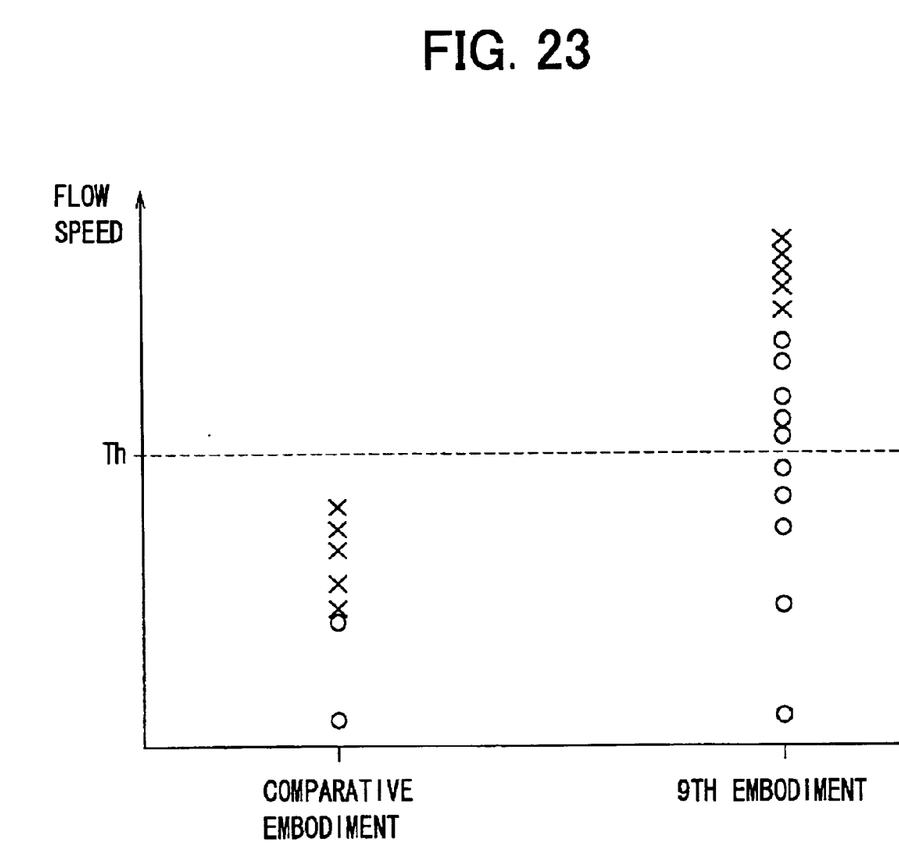
FIG. 23 is a graph showing a durability of airflow meter, the durability being indicated by symbols X (damaged) and O (no damage) according to the ninth embodiment.
Figure 29:
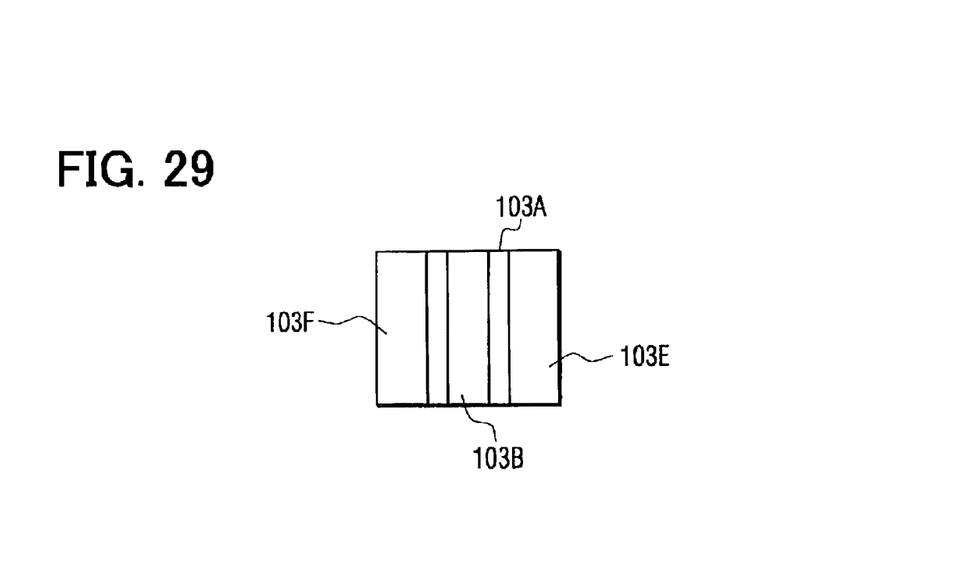
FIG. 29 is a plan view of an inlet of a sensing passage according to a comparative embodiment.

FIG. 23 is a graph showing test results of the ninth embodiment and a comparative embodiment shown in FIG. 29. The inventors test samples under various flow speeds for a specific period of time, and check sensing surfaces of the sensor tips as to whether or not the sensing surface is damaged. In FIG. 23, a symbol X shows a flow speed in which at least one of samples is damaged. A symbol O shows a flow speed in which no sample is damaged. As shown in FIG. 23, the ninth embodiment can withstand higher flow speed compared with the comparative embodiment. In a certain application such as a vehicular engine intake air measuring device, it is required to measure an amount of airflow up to a certain maximum level. For example, a maximum flow speed is set in accordance with applications. The comparative embodiment may not qualify the requirement.

Figure 24:
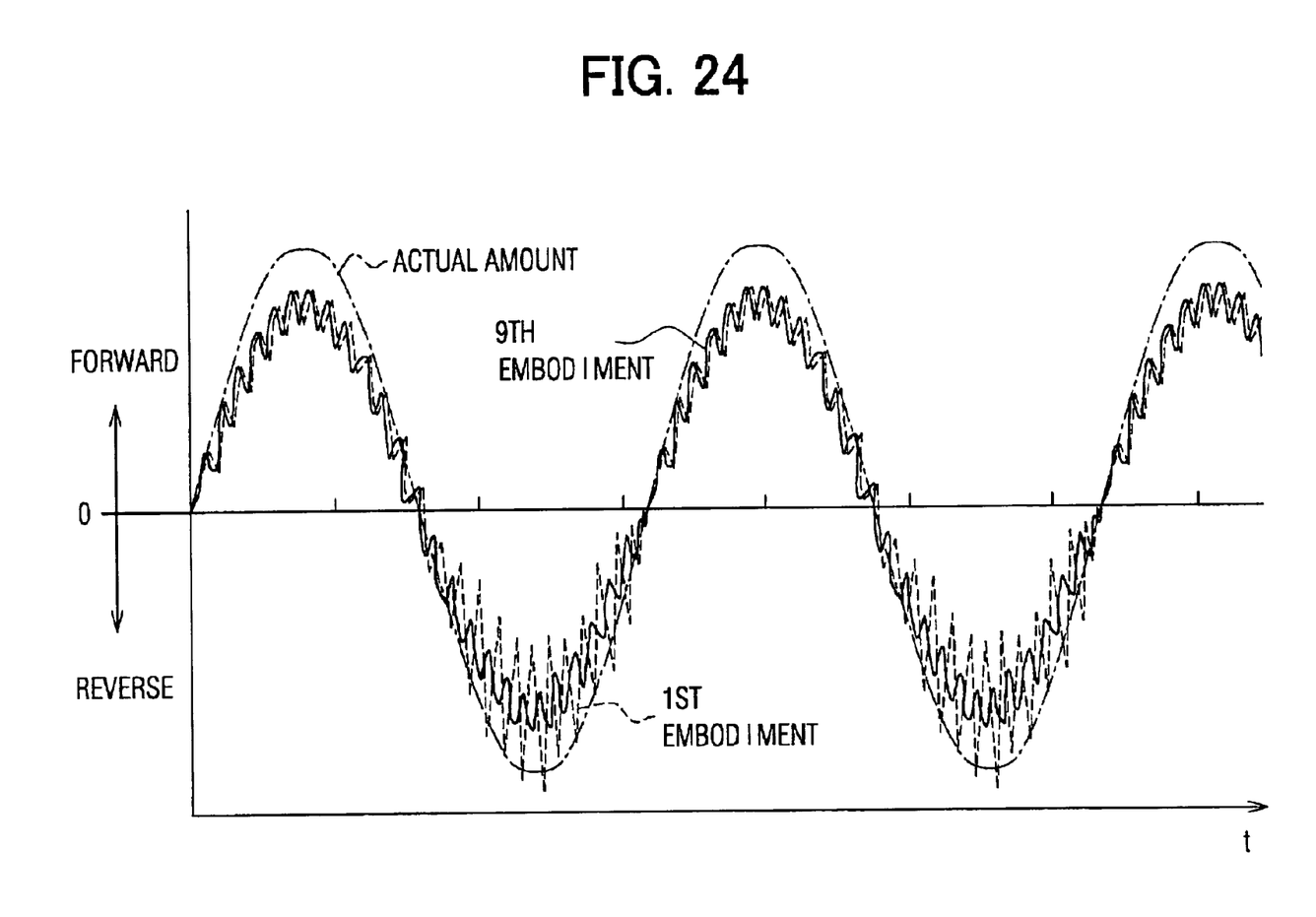
FIG. 24 is a time chart showing output signals of the first embodiment and the ninth embodiment.

FIG. 24 is a time chart showing an amount of airflow. A solid line shows an amount of airflow indicated by an output signal of the ninth embodiment. A broken line shows an amount of airflow indicated by an output signal of the first embodiment. A chain line shows an actual amount of airflow continuously varied in a forward direction and a reverse flow direction. The forward direction corresponds to the longitudinal direction X1 of the intake pipe 10. The first embodiment outputs unstable signal when the airflow is in the reverse direction, because the first embodiment is not adapted to a bi-directional airflow. However, the ninth embodiment outputs relatively stable signal that is approximately to the actual amount.

Figure 25:
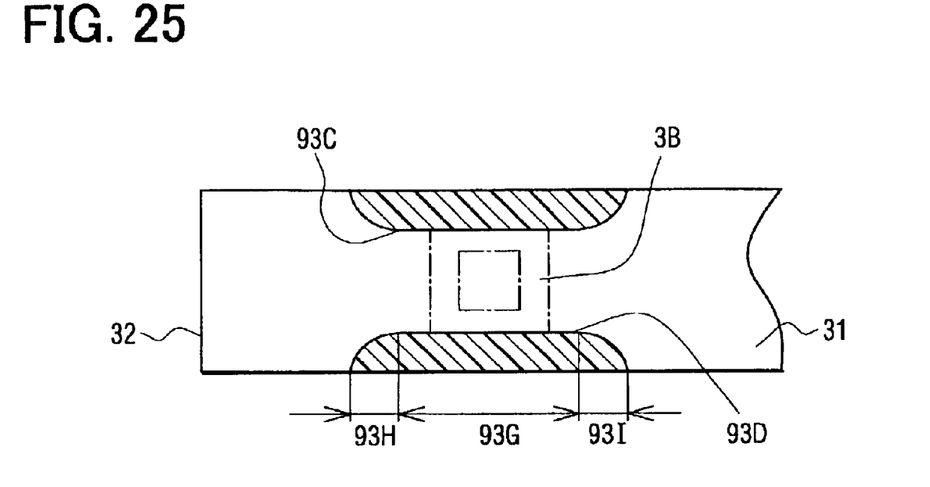
FIG. 25 is a cross-sectional view of a sensing passage according to a tenth embodiment of the present invention.
Figure 26:
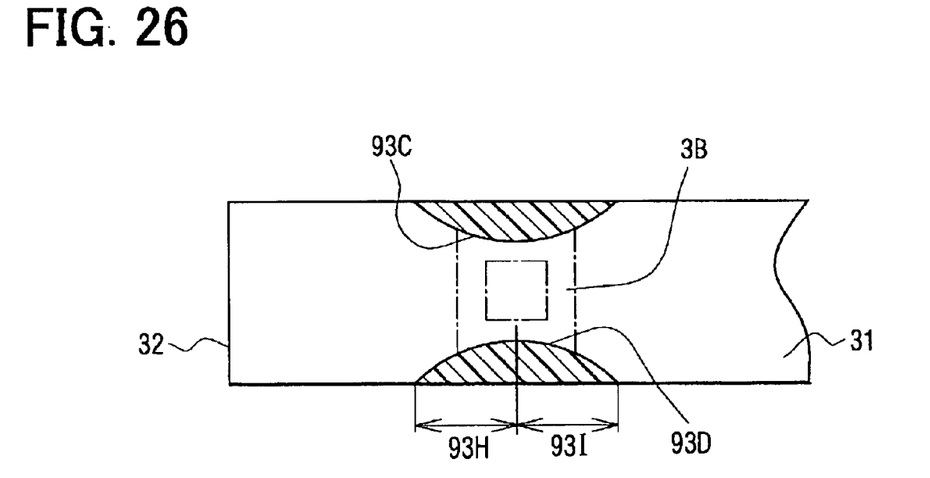
FIG. 26 is a cross-sectional view of a sensing passage according to an eleventh embodiment of the present invention.
Figure 27:
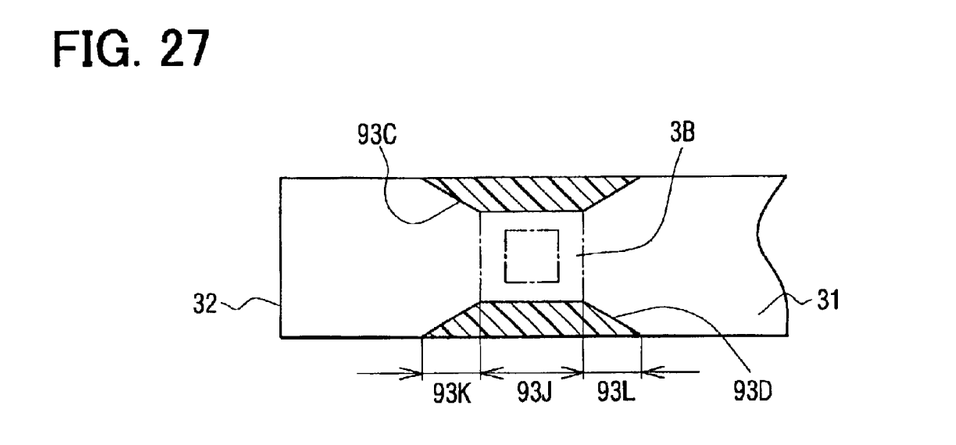
FIG. 27 is a cross-sectional view of a sensing passage according to a twelfth embodiment of the present invention.
Figure 28:
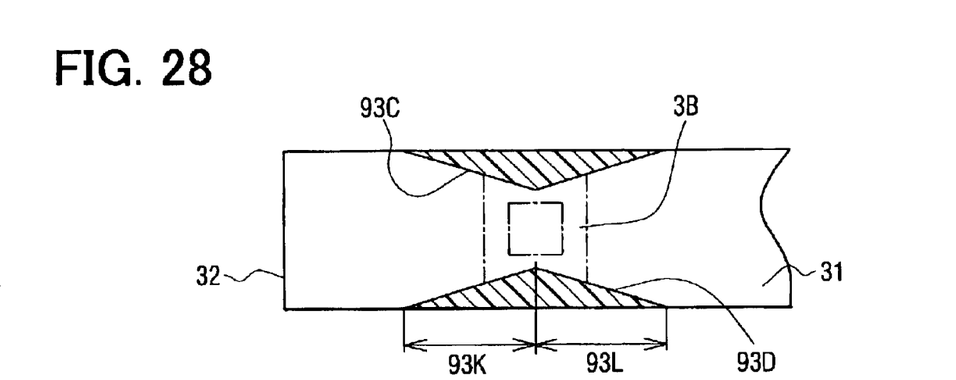
FIG. 28 is a cross-sectional view of a sensing passage according to a thirteenth embodiment of the present invention.

The outside member 939 of the ninth embodiment may have the different profiles for defining restriction. FIGS. 25 to 28 illustrate variations of profiles according to a tenth to thirteenth embodiment respectively, and show views corresponding to FIG. 20. FIG. 25 shows the tenth embodiment that has a slightly longer top plane 93G. The top plane 93G is longer than the longitudinal length of the partition member 3B as shown in FIG. 25. FIG. 26 shows the eleventh embodiment that has no top plane on the surfaces 93C and 93D. The sensing passage is restricted by a curved surface such as a cylindrical projection. FIG. 27 shows the twelfth embodiment in which the surfaces 93C and 93D are defined by flat planes 93J, 93K and 93L. The top plane 93J is parallel to the longitudinal direction X2 and has the same longitudinal length as the partition member 3B. The leading slope 93K gradually restricts the sensing passage. The trailing slope 93L gradually expands the sensing passage. The sensing passage is restricted by a trapezoid surface provided by a trapezoid projection. FIG. 28 shows the thirteenth embodiment in which the surfaces 93C and 93D that have no top plane. The surfaces 93C and 93D has the leading slope 93K and the trailing slope 93L. The slopes 93K and 93L meet at a longitudinal center of the sensor tip 541 as shown in FIG. 28.

Although the sensing passages have square cross-section in the illustrated embodiments, the sensing passage may have an oval cross-section or a lozenge cross-section. For example, the partition member 3B may be located diagonally in FIG. 2. In the case of above, the sensing passage defines a relatively wider distance in the perpendicular direction Z2 on the sensor tip.

As described above, the airflow meters according to the embodiments are capable of preventing the sensor tip from being damaged by a foreign particle or dust, and reducing the influence of fluctuation or pulsation of airflow.

FIG. 29 is a plan view of an inlet of a sensing passage of a comparative embodiment. An outside member 103A defines a sensing passage therein. A partition member 103B separates the sensing passage. The outside member 103A has projections on the opposite sides to the partition member 103B. The outside member 103A defines a surface 103E and a surface 103F both defining a restrictor. The sensing passage is only restricted in the perpendicular direction with respect to a sensor tip mounted on the partition member 103B.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An airflow meter, comprising:
    a member that defines a bypass passage in which a bypass air flow comprising a part of air flowing in a main passage is introduced; and
    a sensor element disposed in the bypass passage, for detecting an amount of airflow, said sensor element being disposed so that a width of the sensor element is perpendicular to a direction of bypass air flow therepast, wherein
    the bypass passage has a sensing passage which restricts a cross-sectional area of the bypass passage along a longitudinal direction of the bypass passage at least before the sensor element, the sensing passage being restricted in a lateral direction that is perpendicular to said direction of bypass air flow and parallel to a width direction of the sensor element.

2. The airflow meter according to claim 1, wherein the sensor element has a surface for detecting the amount of airflow, and the member comprises:
    an outside member defining the sensing passage; and
    a partition member disposed in the sensing passage for separating the sensing passage, the partition member supporting the sensor element so that the surface of the sensor element is supported in parallel to the longitudinal direction of the sensing passage, and
    the lateral direction is perpendicular to both the longitudinal direction of the sensing passage and a perpendicular direction perpendicular to the surface of the sensor element.

3. The airflow meter according to claim 2, wherein the outside member defines a lateral surface that decreases the width of the sensing passage in the lateral direction, and a perpendicular surface that is perpendicular to the lateral surface and that faces the sensor element and decreases a width of the sensing passage in the perpendicular direction.

4. The airflow meter according to claim 3, wherein the sensor element is a unidirectional sensor that detects the amount of airflow in a forward direction of the longitudinal direction, and the outside member defines a means for decreasing an airflow in a reverse direction of the longitudinal direction.

5. The airflow meter according to claim 3, wherein the sensor element is a bi-directional sensor that detects the amount of airflow in both of a forward and reverse directions of the longitudinal direction, and the outside member defines curved surfaces or slopes on both ends in the longitudinal direction to introduce both the forward and the reverse airflows to the sensor element.

6. The airflow meter according to claim 5, wherein the outside member defines a plane parallel to the longitudinal direction, the plane being located on a lateral side of the sensor element.

7. The airflow meter according to claim 1, wherein the bypass passage has a largest cross-sectional area at an inlet thereof, and the sensing passage being restricted in both width in the lateral direction and width in a perpendicular direction perpendicular to the sensor element.

8. The airflow meter according to claim 7, wherein the sensing passage is gradually restricted from upstream of the sensor element to downstream of the sensor element.

9. The airflow meter according to claim 7, wherein the sensing passage is gradually restricted in width in a perpendicular direction that is perpendicular to the surface of the sensor element before the sensing passage is gradually restricted in both directions.

10. The airflow meter according to claim 7, wherein the sensing passage has a profile that decreases airflow in a reverse direction of the longitudinal direction.

11. The airflow meter according to claim 7, wherein the sensing passage has a profile that is capable of regulating airflow in both of a forward direction and a reverse direction of the longitudinal direction.

12. The airflow meter according to claim 7, wherein the sensing passage has a profile that abruptly changes restricting rate at a point close to the sensor element.

13. The airflow meter according to claim 7, wherein the sensing passage is defined by surfaces that has different heights.

14. The airflow meter according to claim 7, wherein the sensing passage defines a constant cross-sectional area or a decreasing cross-sectional area at a predetermined area downstream to the sensor element.

15. The airflow meter according to claim 7, wherein the member defines the bypass passage so as to protect the sensor element from an inlet of the bypass passage.

16. The airflow meter according to claim 1, wherein the sensing passage is restricted only in width in the lateral direction, the sensing passage being restricted by a surface that is gradually increased in height at upstream to the sensor element and is gradually decreased in height at downstream to the sensor element, and the sensing passage is defined as follows:

$1.0 \leq L1/H$ $1.0 \leq L2/H$ $2.5 \leq W/H \leq 20.0$ wherein H is a maximum height of the surface, L1 is a length in the longitudinal direction between a beginning point of restriction and the maximum height, L2 is a length in the longitudinal direction between the maximum height and an ending point of restriction, and W is a width of the bypass passage.

17. The airflow meter according to claim 16, wherein the sensing passage is restricted in an asymmetrical manner in the longitudinal direction with respect to the maximum height.

18. The airflow meter according to claim 16, wherein the sensing passage is restricted in a symmetrical manner in the longitudinal direction with respect to the maximum height.

19. The airflow meter according to claim 18, wherein the sensing passage is restricted by a curved surface.

20. The airflow meter according to claim 18, wherein the sensing passage is restricted by a trapezoid surface.

* * * * *